United States Patent [19]
Nakamura

[11] Patent Number: 5,876,259
[45] Date of Patent: Mar. 2, 1999

[54] TILT CYLINDER APPARATUS FOR BOAT PROPELLER UNIT

[75] Inventor: Tamotsu Nakamura, Saitama, Japan

[73] Assignee: Showa Corporation, Gyoda, Japan

[21] Appl. No.: 961,892

[22] Filed: Oct. 31, 1997

[30] Foreign Application Priority Data

Nov. 5, 1996 [JP] Japan ..................................... 8-307533

[51] Int. Cl.⁶ ................................................. B63H 20/10
[52] U.S. Cl. ............................................... 440/56; 440/61
[58] Field of Search .................................. 440/61, 55, 56

[56] References Cited

U.S. PATENT DOCUMENTS 3,990,660  11/1976  Pipoz .
4,784,625  11/1988  Nakahama ................................ 440/55
4,944,705   7/1990  Kashima et al. ......................... 440/61

FOREIGN PATENT DOCUMENTS

258155  12/1990  Japan .

Primary Examiner—Sherman Basinger
Attorney, Agent, or Firm—Dvorak & Orum

[57] ABSTRACT

A tilt cylinder apparatus for a boat propeller unit comprising a cylinder unit containing an inside cylinder and an outside cylinder, an opening portion of the cylinders being closed by rod guides, a piston which is connected to an end of a piston rod placed through the rod guides and disposed slidably in the inside cylinder, a reservoir chamber which is formed between the inside cylinder and the outside cylinder and contains a fluid chamber and an air chamber, a communicating path which is formed in the rod guides and ensures a communication between the rod side chamber and the reservoir chamber through a conduit pipe disposed in the reservoir chamber, and a selecting valve which is disposed in the rod guides and selects an opening or closing of the communicating path following an outside operation, wherein when the communicating path is opened, air pressure in the air chamber of the reservoir chamber pushes the piston rod out of the cylinder unit so as to tilt up the boat propeller unit.

4 Claims, 8 Drawing Sheets

TILT CYLINDER APPARATUS FOR BOAT PROPELLER UNIT

BACKGROUND OF THE INVENTION

1. Field of the Invention

This invention relates to a tilt cylinder apparatus for use in an outboard motor or the like.

2. Discussion of the Background Art

The tilt cylinder apparatus for use with a boat propeller unit, for example, an outboard motor, is disposed between the boat body and an outboard motor tiltingly supported by the boat body, and is used for tilting the outboard motor by extending the cylinder apparatus.

The aforementioned tilt cylinder apparatus for boat propeller has been disclosed in U.S. Pat. No. 3,990,660 (first prior art reference) and Japanese Patent Application publication (JP-B) No.2-58155 (second prior art reference).

The first prior art will be described in detail. An interior of the cylinder is sectioned to a rod side chamber containing a piston rod and a piston side chamber not containing the piston rod, by means of a piston. An air chamber is provided in the piston side chamber of the cylinder across a free piston. The rod side chamber communicates with the piston side chamber through a communicating path formed in the piston. A selecting valve for selecting an opening/closing of this communicating path is disposed in this piston. A function of tilting up the propeller unit is executed by opening the selecting valve by operating an operating rod provided in the piston rod so as to ensure communication between the piston side chamber and the rod side chamber through the communicating path, and move the piston to the rod side chamber by an action of air pressure in the air chamber so as to push the piston rod out of the cylinder.

According to the second prior art reference, the interior of the cylinder is sectioned to the rod side chamber and the piston side chamber by the piston. The air chamber is provided in the piston side chamber of the cylinder. A communicating path between the rod side chamber and the piston side chamber is opened or closed by means of the selecting valve. The communicating path and the selecting valve are provided outside the cylinder. The aforementioned function of tilting up the propeller unit is executed by opening the communicating path by operating the selecting valve so that the piston is moved to the rod side chamber by action of air pressure in the air chamber, thereby pushing the piston rod out of the cylinder.

According to the first prior art reference, the air chamber is provided in the cylinder and the communicating path and the selecting valve are disposed in the piston. As a result, a compactness of the apparatus is achieved. However, because the operating rod for operating the selecting valve is disposed within the piston rod and an operating portion of the operating rod is located at an end of the piston rod so that the operating rod is apart from the boat body, the operability of the selecting valve, that is, the operability of the apparatus is reduced.

According to the second prior art reference, because the communicating path and the selecting valve are disposed outside the cylinder, a position of the operating portion of the selecting valve can be determined arbitrarily. However, because the communicating path and the selecting valve are disposed outside the cylinder, enlargement of the apparatus is unavoidable.

SUMMARY OF THE INVENTION

Accordingly, the present invention has been proposed to solve the above problems. An object of the present invention is to provide a tilt cylinder apparatus for a boat propeller unit, which is capable of achieving the compactness of the apparatus and enhancing the operability thereof.

According to the present invention, there is provided a tilt cylinder apparatus for a boat propeller unit or motor, which is disposed between a boat body and the motor supported tiltingly by the boat body. The tilt cylinder apparatus comprises a cylinder unit containing an inside cylinder and an outside cylinder, an opening portion of the cylinders being closed by rod guides. The interior of the inside cylinder is filled with hydraulic oil, and a piston has a buffering valve mechanism, which is disposed slidably in the interior of the inside cylinder and connected to an end of a piston rod placed through the rod guides such that the interior of the inside cylinder is sectioned to a rod side chamber in which the piston rod is locating and a piston side chamber in which the piston rod does not exist. A reservoir chamber is formed between the inside cylinder and the outside cylinder and contains an oil chamber and an air chamber. The oil chamber communicates with the piston side chamber, a communicating path formed in the rod guides which ensures a communication between the rod side chamber and the oil chamber of the reservoir chamber through an oil path formed by sectioning in the reservoir chamber, and a selecting valve which is disposed in the rod guides and provides an opening or closing of the communicating path. When the communicating path is opened by the selecting valve, air pressure in the air chamber of the reservoir chamber pushes the piston rod out of the cylinder unit through the piston side chamber and the piston so as to tilt up the motor.

BRIEF DESCRIPTION OF THE DRAWINGS

The present invention will be understood more fully from the detailed description given hereinbelow and from the accompanying drawings of the preferred embodiments of the invention.

In the drawings.

DESCRIPTION OF THE PREFERRED EMBODIMENTS

Hereinafter, embodiments of the present invention will be described in detail with reference to the accompanying drawings.

(A) First embodiment

Figure 1:
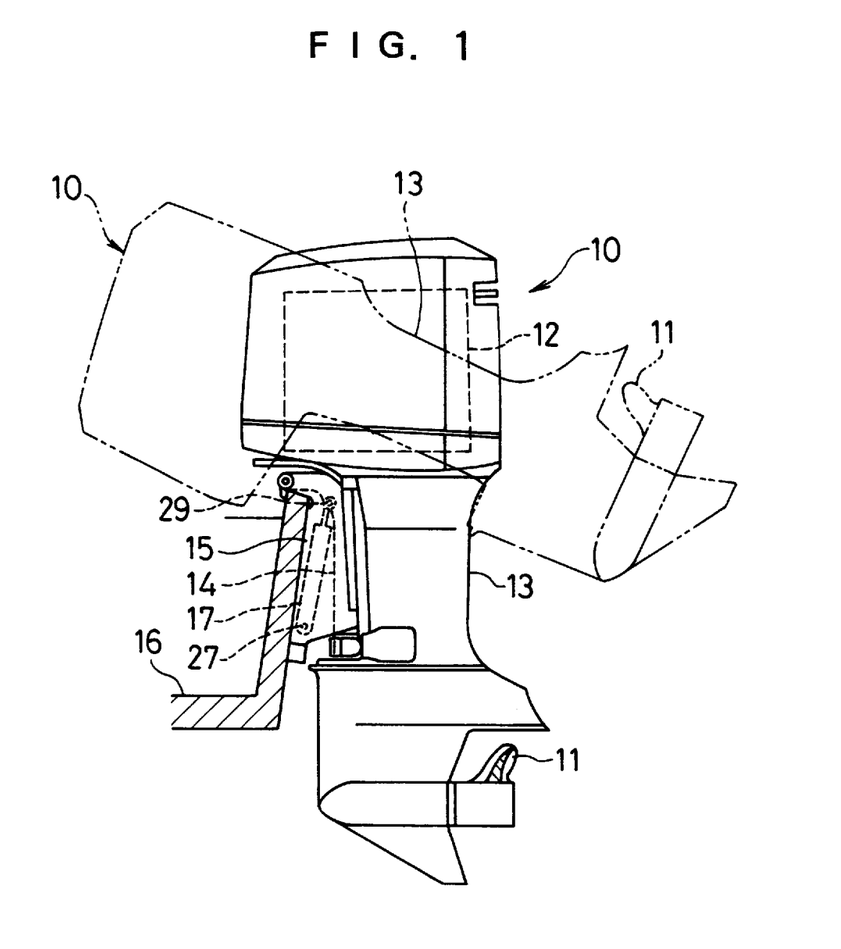
FIG. 1 is a side view showing a tilt cylinder apparatus for an outboard motor, according to a first embodiment of the present invention, together with the outboard motor.
Figure 2:
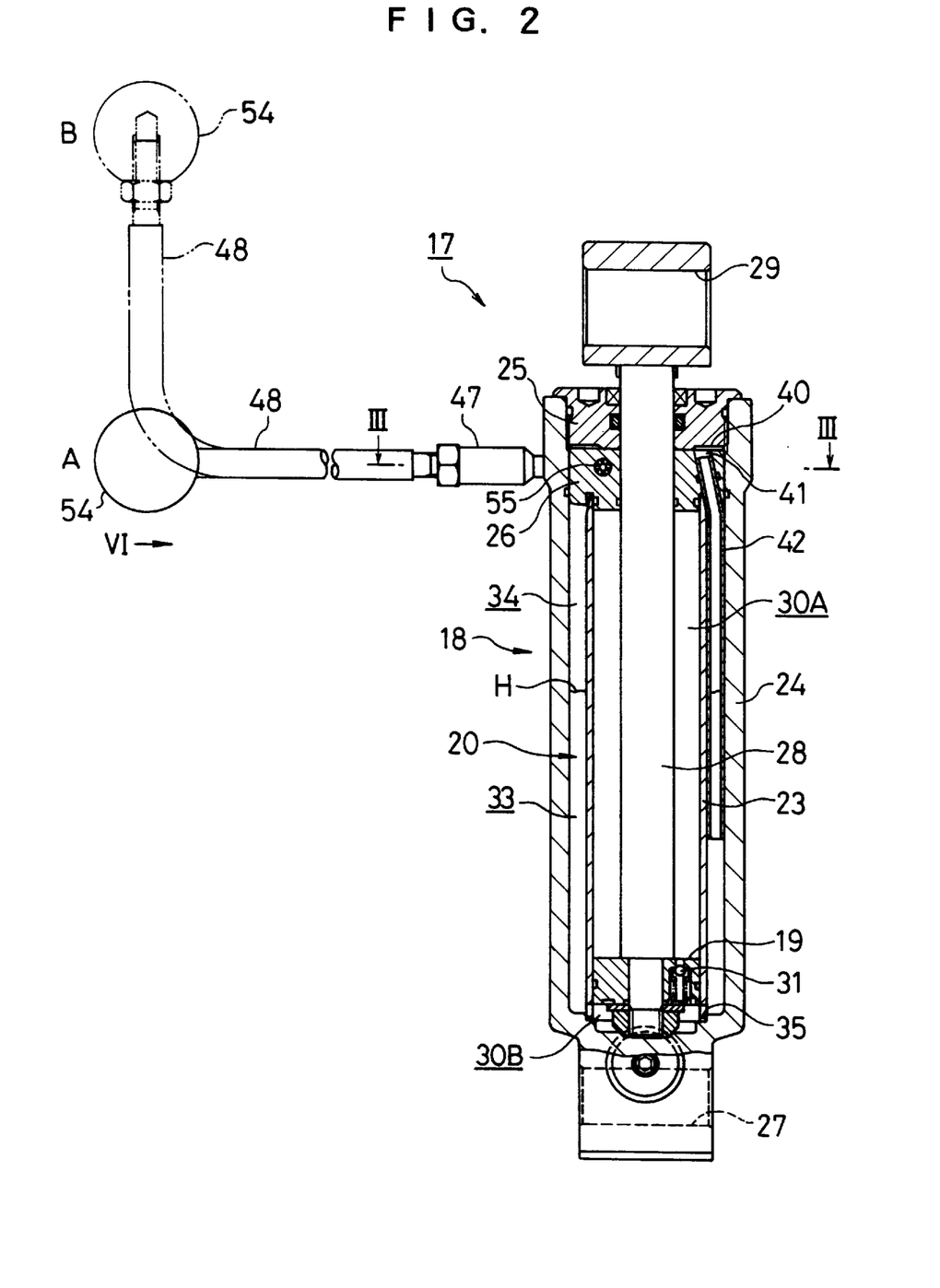
FIG. 2 is a sectional view of the tilt cylinder apparatus shown in FIG. 1, taken along the lines II—II in FIG. 3.
Figure 3:
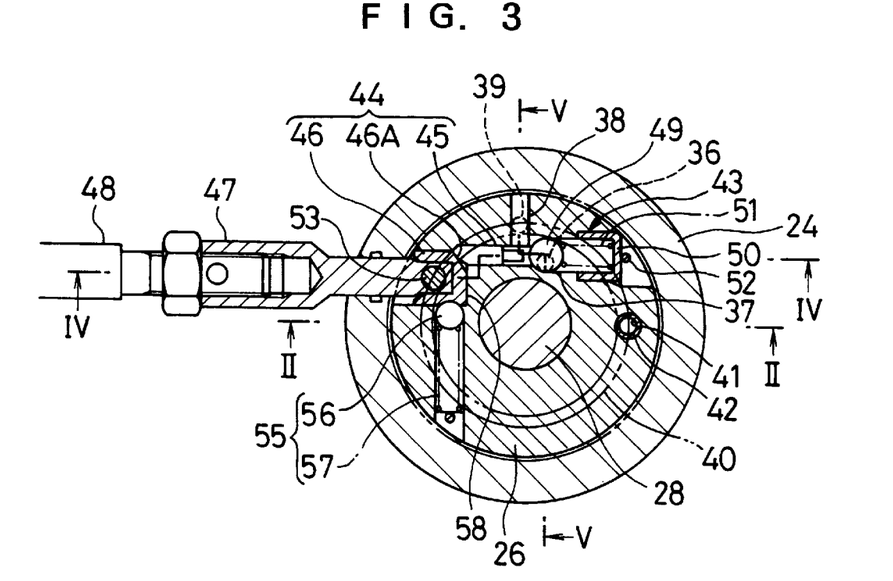
FIG. 3 is a sectional view taken along the line III—III in FIG. 2.
Figure 4:
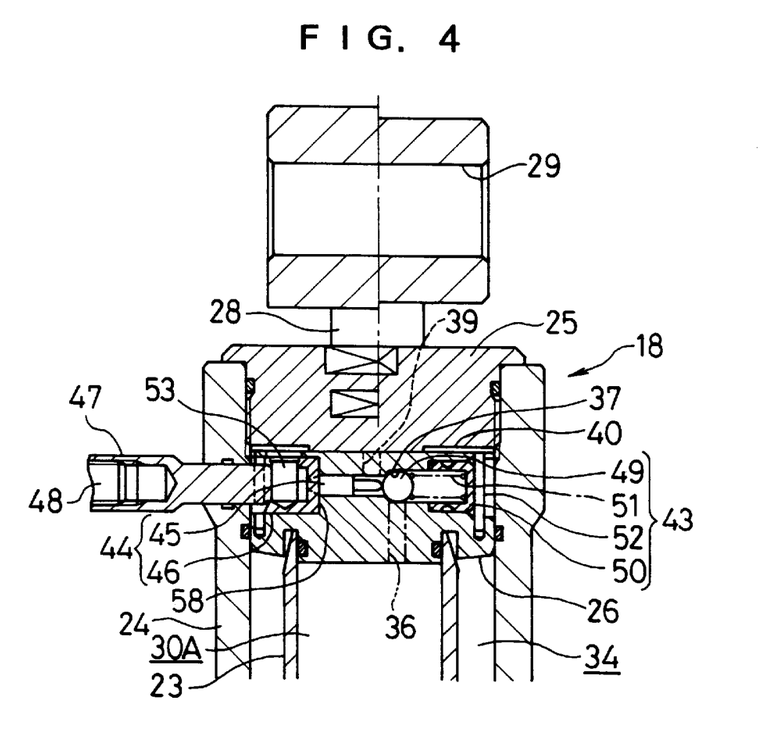
FIG. 4 is a sectional view taken along the lines IV—IV in FIG. 3.
Figure 5:
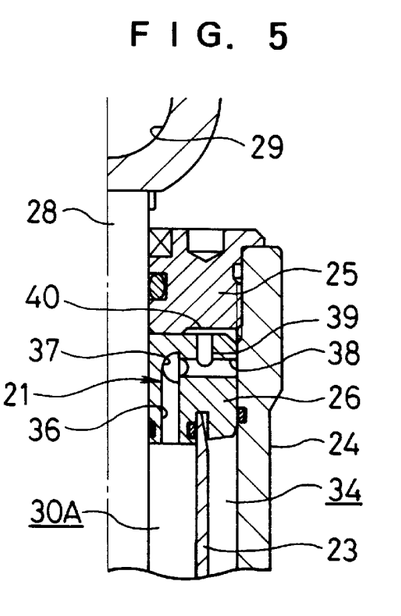
FIG. 5 is a sectional view taken along the lines V—V in FIG. 3.
Figure 6:
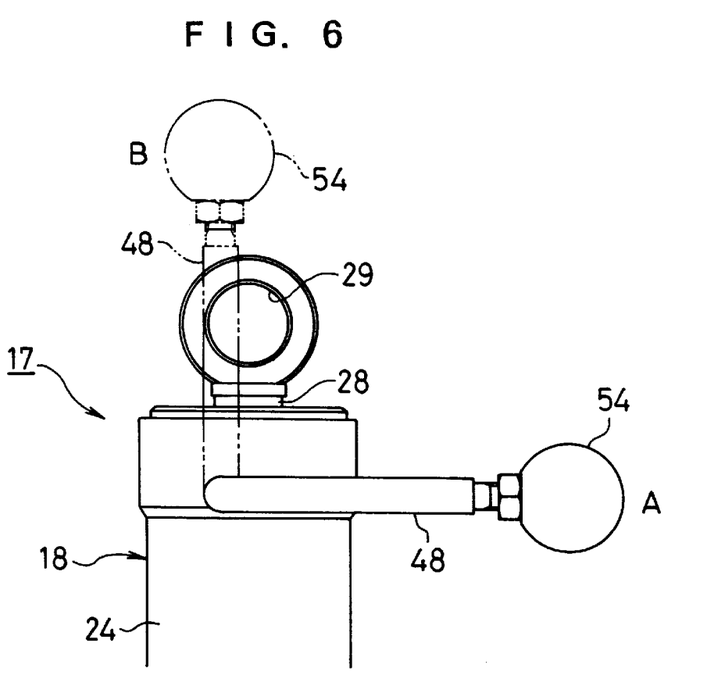
FIG. 6 is a view taken in the direction of the arrow VI in FIG. 2.
Figure 7:
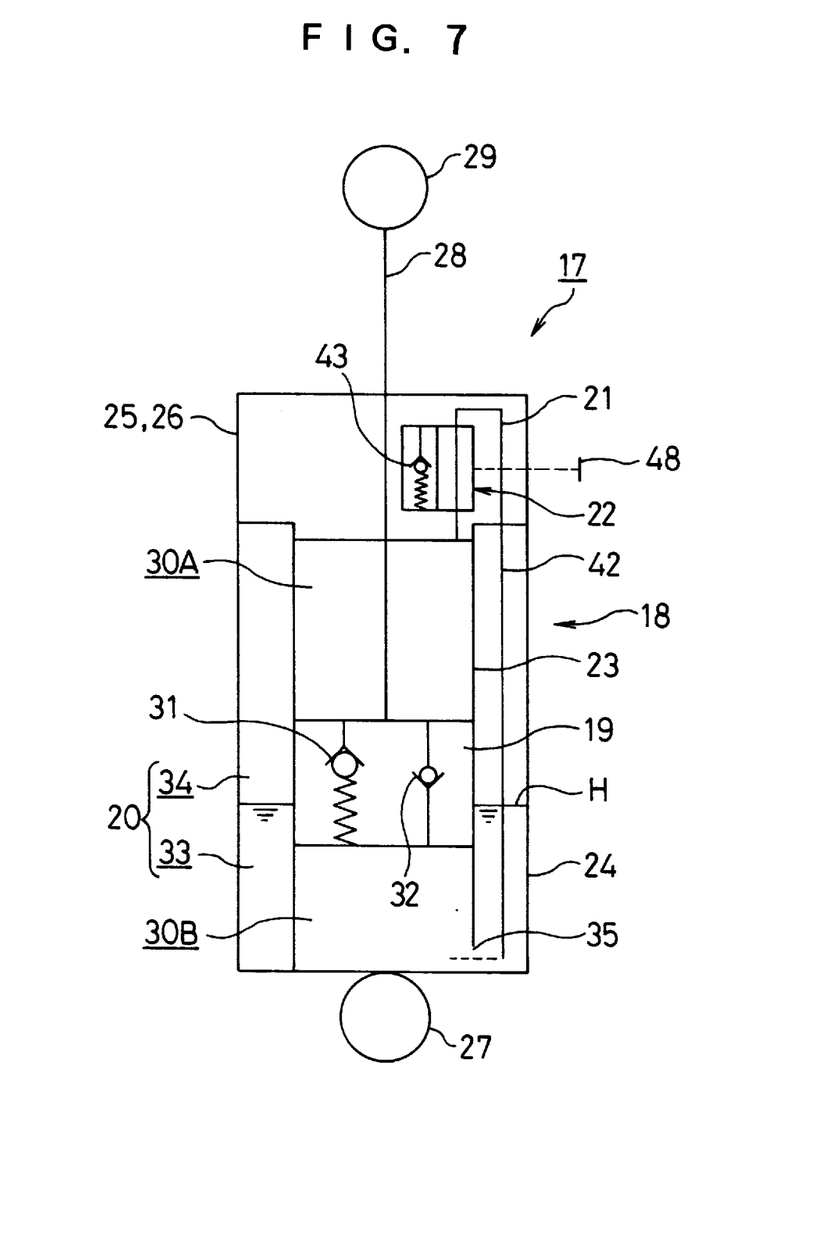
FIG. 7 is a structure diagram schematically showing the tilt cylinder apparatus shown in FIG. 2.

FIG. 1 is a side view showing a tilt cylinder apparatus for an outboard motor according to a first embodiment of the present invention, together with the outboard motor. FIG. 2 is a sectional view of the tilt cylinder apparatus shown in FIG. 1, taken along the lines II—II in FIG. 3. FIG. 3 is a sectional view taken along the lines III—III in FIG. 2. FIG. 4 is a sectional view taken along the lines IV—IV in FIG. 3. FIG. 5 is a sectional view taken along the lines V—V in FIG. 3. FIG. 6 is a view taken in the direction of the arrow VI. FIG. 7 is a structure diagram showing schematically the tilt cylinder apparatus shown in FIG. 2.

As shown in FIG. 1, in an outboard motor 10, a propeller unit 13 comprising a propeller 11 and an engine 12 is supported swivelingly in the horizontal direction by a swivel bracket 14. The swivel bracket 14 is supported tilting in the vertical direction by a clamp bracket 15. The clamp bracket 15 grips the boat body 16 so that it is fixed on the boat body 16. As a result, the propeller unit 13 can be swiveled horizontally relative to the boat body 16 and can be tilted vertically. The propeller 11 of this outboard motor 10 is driven in normal or reverse direction by an engine 12, so that the boat body 16 is advanced or retracted.

A tilt cylinder apparatus 17 is disposed between the swivel bracket 14 and the clamp bracket 15 for the outboard motor 10. This tilt cylinder apparatus 17 tilts the propeller unit 13 by air pressure in a air chamber 34 (mentioned later) of the tilt cylinder unit 17, such that the motor is raised above water level.

As shown in FIGS. 2, 7, this tilt cylinder apparatus 17 comprises a cylinder unit 18, a piston 19, a reservoir chamber 20, a communicating path 21 and a selection valve 22.

The aforementioned cylinder unit 18 is formed in double structure composed of an inside cylinder 23 and an outside cylinder 24. The inside cylinder 23 and the outside cylinder 24 are so structured with an end of each being closed. A first rod guide 25 and a second rod guide 26 are disposed at an opening of the other end, such that the aforementioned opening is closed. A shaft supporting portion 27 is formed at the aforementioned end of the outside cylinder 24 and the cylinder unit 18 is supported by a clamp bracket 15 through the shaft supporting portion 27. The interior of the inside cylinder 23 is filled with hydraulic fluid.

The aforementioned piston 19 is connected to an end of the piston rod 28 such that it is disposed slidably inside the inside cylinder 23. The piston rod 28 is extended out of the cylinder unit 18 through the first rod guide 25 and the second rod guide 26. The inside cylinder 23 is sectioned to a rod side chamber 30A incorporating the piston rod 28 and a piston side chamber 30B in which no piston rod is contained, by the piston 19. In the piston rod 28, a shaft supporting portion 29 is formed at one end which is extended from the cylinder unit 18 and this shaft supporting portion 29 is supported by the swivel bracket 14.

A buffering valve 31 and a return valve 32 are disposed in the piston 19. When the propeller unit 13 collides with a driftwood or the like during travel of the boat so that a pressure in the rod side chamber 30A rises over a predetermined pressure, the buffering valve 31 permits hydraulic fluid in rod side chamber 30A to flow out into the piston side chamber 30A. An impact energy is absorbed by fluid resistance of hydraulic fluid flowing through the buffering valve 31 so as to buffer the impact due to the collision. The return valve 32 allows a flow of hydraulic fluid from the piston side chamber 30B to the rod side chamber 30A, and, after the impact is absorbed, allows the piston 19 to return to its predetermined position by its own weight of the propeller unit 13.

The aforementioned reservoir chamber 20 is formed between the inside cylinder 23 and the outside cylinder 24, and contains a chamber 33 filled with hydraulic fluid and an air chamber 34 filled with air. Reference symbol H indicates a fluid level. The inside cylinder 23 has an opening 35, which makes the fluid chamber 33 communicate with the piston side chamber 30B.

As shown in FIGS. 3–5, the aforementioned communicating path 21 comprises a first communicating passage 36, a valve chamber 37, a second communicating passage 38 and a third communicating passage 39, formed in the second rod guide 26 so as to communicate with each other. An annular groove 40 is formed in the first rod guide 25 so as to communicate with a third communicating passage 39, and a fourth communicating passage 41 which is formed in the first rod guide 25 as shown in FIG. 2, so as to communicate with the annular groove 40. The first communicating passage 36 communicates with the rod side chamber 30A. An end of a conduit pipe 42 connects to the fourth communicating passage 41. This conduit pipe 42 is incorporated in the reservoir chamber 20. One end thereof reaches the fluid chamber 33. Thus, the fluid chamber 33 of the reservoir chamber 20 communicates with the rod side chamber 30A through the conduit pipe 42, the fourth communicating passage 41, the annular groove 40, the third communicating passage 39, the second communicating passage 38, the valve chamber 37 and the first communicating passage 36.

The aforementioned selection valve 22 is disposed in the second rod guide 26 as shown in FIGS. 3, 5, and comprises a relief valve 43 and a selecting mechanism 44 for opening and closing this relief valve 43. The selecting mechanism 44 comprises a selecting pin 45 and a selecting cam 46. The selecting cam 46 is connected to an operating lever 48 through a holder 47.

As for the relief valve 43, a ball 49 is disposed as a valve body within the valve chamber 37 and this ball 49 is supported and urged by the other end of the spring 51. One end of spring 51 is supported by a spring receiver 50. This ball 49 is capable of shutting down communication between the first communicating passage 36 and the second communicating passage 38.

The spring receiver 50 is fixed in position by means of a stopper pin 52. Spring 51 is axially parallel to the axis lines of the holder 47 and the operating lever 48.

The selecting pin 45 is disposed in the second rod guide 26 such that it is movable along the axis lines of the holder 47 and the operating lever 48 and the axis lines of the spring 51 of the relief valve 43. An end of this selecting pin 45 is fitted to the ball 49 in the relief valve 43 and the other end thereof is fitted to a ceiling plate 58 of the selecting cam 46.

A cutout portion 46A is formed on an outside face of the ceiling plate 58 of the aforementioned selecting cam 46. This selecting cam 46 is rotatably connected to the holder 47 through a connecting pin 53. An end of the operating lever 48 is fastened to the holder 47. The operating lever 48 is formed in an L-shape as shown in FIGS. 2, 6 and a grip portion 54 is connected to the other end thereof.

When the operating lever 48 is rotated by an outside force so as to bring this grip portion 54 to a position A shown in FIGS. 2, 6, a proximal end of the selecting pin 45 engages to the cutout portion 46A of the selecting cam 46. An end of the selecting pin 45 does not press the ball 49 in the relief valve 43 against a spring urging force of the spring 51, so that the ball 49 in the relief valve 43 shuts down communicating between the first communicating passage 36 and the second communicating passage 38.

When the operating lever 48 is rotated by an outside force so as to bring the grip portion 54 to a position B, the proximal end of the selecting pin 45 rides over the ceiling plate without having the cutout portion 46A of the selecting cam 46, so that the selecting pin 45 is moved axially. As a result, the end portion of this selecting pin 45 presses the ball 49 in the relief valve 43 against the spring urging force of the spring 51 so as to ensure the communicating condition between the first communicating passage 36 and the second communicating passage 38.

Reference numeral 55 in FIG. 3 denotes a click mechanism. The click mechanism moderates a rotation of the selecting cam 46 caused by the operating lever 48, by making a spring force of the click spring 57 act upon an outside face of the selecting cam 46 through a click ball 56.

When as described above, the communication between the first communicating passage 36 and the second communicating passage 38 is attained by the selecting valve 22, that is, the communicating path 21 is brought into the communicating condition as shown in FIG. 7, air pressure in the air chamber 34 of the reservoir chamber 20 is applied to the piston 19 through hydraulic fluid in the chamber 33 and the piston side chamber 30B in the reservoir chamber 20. In this condition, hydraulic fluid in the rod side chamber 30A passes successively the first communicating passage 36, the valve chamber 37, the second communicating passage 38, the third communicating passage 39, the annular groove 40, the fourth communicating passage 41 and the conduit pipe 42 of the aforementioned communicating path 21, so that it returns to the fluid chamber 33 of the reservoir chamber 20 and further flows into the piston side chamber 30B through the opening 35. As a result, the piston rod 28 is pushed out from the cylinder unit 18 by the aforementioned air pressure, so that the propeller unit 13 is tilted up.

When the communication between the first communicating passage 36 and the second communicating passage 38 is shut down by the relief valve 43 in the selecting valve 22, that is, the communicating path 21 is shut down, hydraulic fluid in the rod side chamber 30A does not flow into the fluid chamber 33 in the reservoir chamber 20 and the piston side chamber 30B through the communicating path 21 and the conduit pipe 42. At this time, air pressure of the air chamber 34 in the reservoir chamber 20 supports a load of the propeller unit 13. As a result, the piston 19 and the piston rod 28 are stopped at each arbitrary position when the communicating path 21 is shut down. Thus, the propeller unit 13 is stopped at an arbitrary position when the communicating path 21 is shut down, and is then locked from further tilting.

If the propeller unit 13 collides with a driftwood or the like during travel of the boat body 16 under this locking condition, the piston 19 is suddenly pulled upward to the rod side chamber 30A so that a pressure in the rod side chamber 30A is raised. As a result, the buffering valve 31 is opened to allow hydraulic fluid in the rod side chamber 30A to flow into the piston side chamber 30B. When hydraulic fluid flows through the buffering valve 31, impact energy is absorbed. When the high pressure in the rod side chamber 30A vanishes after the impact is absorbed, hydraulic fluid in the piston side chamber 30B is returned to the rod side chamber 30A through the return valve 32 by a load of the propeller unit 13, so that the piston 19 and the piston rod 28 are returned to their original positions, that is, the propeller unit 13 is returned to its original position.

In the above embodiments, the following effects (1)–(4) are attained.

(1) The reservoir chamber 20 containing the air chamber 34 and the fluid chamber 33 is formed between the inside cylinder 23 and the outside cylinder 24. The communicating path 21 (first communicating passage 36, valve chamber 37, second communicating passage 38, third communicating passage 39, annular groove 40, fourth communicating passage 41) which makes the rod side chamber 30A communicate with the fluid chamber 33 of the reservoir chamber 20 is formed in the rod guides 25, 26. The selecting valve 22 for opening/closing the communicating path 21 is disposed in the second rod guide 26. Thus, the reservoir chamber 20, the communicating path 21 and the selecting valve 22 can be integrated in the cylinder unit 18, thereby achieving compactness of the tilt cylinder apparatus 17.

(2) Because the selecting valve 22 (relief valve 43, selecting valve 45, selecting cam 46) which opens/closes the communicating path 21 following an external operation of the operating lever 48 is disposed in the second rod guide 26, an operating position for the selecting valve 22 can be set at a position allowing the valve to be operated freely from outside (inside of the boat 16). As a result, operability of the selecting valve 22, and further operability of the tilt cylinder apparatus 17 can be increased.

(3) Because the communicating path 21 formed in the first rod guide 25 and the second rod guide 26 is made to communicate with the fluid chamber 33 in the reservoir chamber 20 through the conduit pipe 42 disposed in the reservoir chamber 20, when the propeller unit 13 is tilted down such that the piston rod 28 is made to invade the cylinder unit 18, hydraulic fluid in the fluid chamber 33 of the reservoir chamber 20 can be introduced into the rod side chamber 30A through the conduit pipe 42, thereby preventing air in the air chamber 34 of the reservoir chamber 20 from being mixed in hydraulic fluid in the rod side chamber 30A.

(4) Because it is possible to prevent air in the air chamber 34 of the reservoir chamber 20 from being mixed in hydraulic fluid in the rod side chamber 30A when the propeller unit 13 is tilted down, as described above (3), no partition member separating the air chamber 34 from the fluid chamber 33 is required in the reservoir chamber 20. As a result, the structure of the reservoir chamber 20 can be simplified.

(B) Second embodiment

Figure 8:
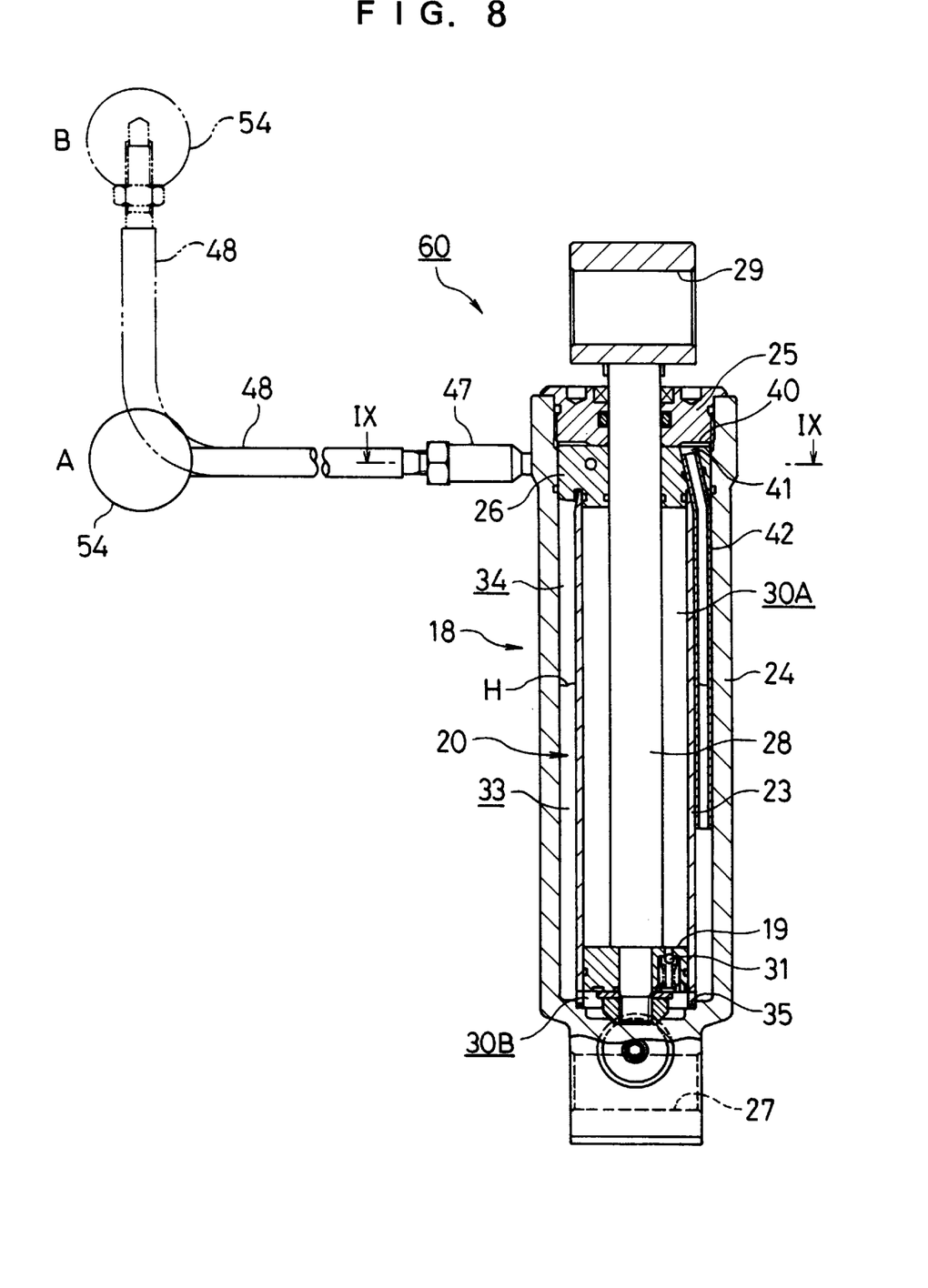
FIG. 8 is a sectional view of the tilt cylinder apparatus for an outboard motor according to a second embodiment of the present invention, taken along the lines VIII—VIII in FIG. 9.
Figure 9:
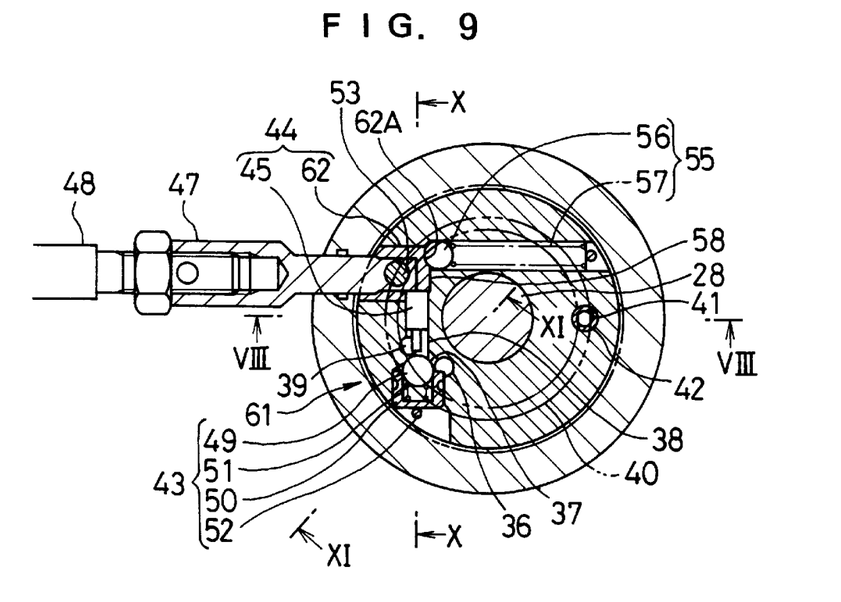
FIG. 9 is a sectional view along the lines IX—IX in FIG. 8.
Figure 10:
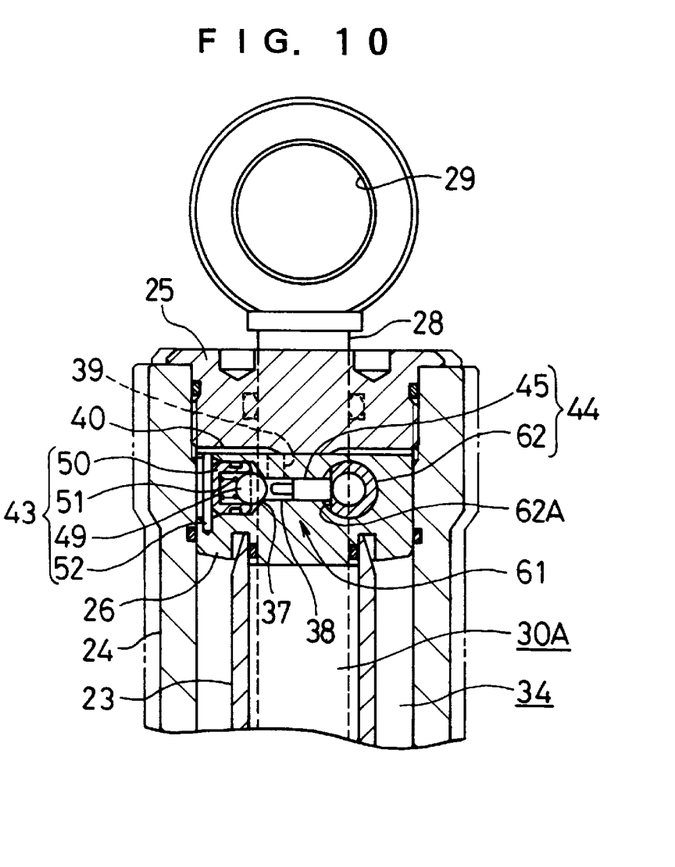
FIG. 10 is a sectional view taken along the lines X—X in FIG. 9.
Figure 11:
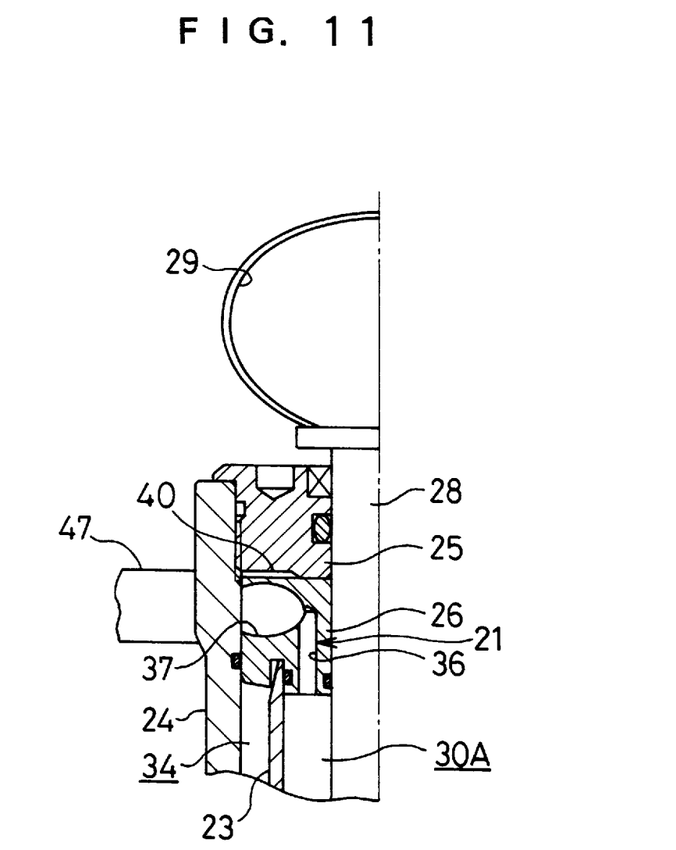
FIG. 11 is a sectional view taken along the lines XI—XI in FIG. 9.

FIG. 8 shows a second embodiment of the tilt cylinder apparatus for outboard motor according to the present invention. FIG. 8 is a sectional view taken along the lines VIII—VIII in FIG. 9. FIG. 9 is a sectional view taken along the lines IX—IX in FIG. 8. FIG. 10 is a sectional view taken along the lines X—X in FIG. 9. FIG. 11 is a sectional view taken along the lines XI—XI in FIG. 9. In the second embodiment, the same reference numerals are attached to the same parts as the first embodiment and then, a description thereof is omitted.

In this tilt cylinder apparatus 60, allocations of the relief valve 43 in a selecting valve 61 and the selecting pin 45 relative to the second rod guide 26 and a shape of a selecting cam 62 are different from the case of the first embodiment.

That is, the relief valve 43 is disposed so that the axis line of the spring 51 is perpendicular to the axis lines of the holder 47 and the operating lever 48. The selecting pin 45 is disposed so as to be movable in the axial direction of the spring 51. A cutout portion 62A is formed on an outside face of a selecting cam 62. The click mechanism 55 is disposed so as to be able to contact the ceiling plate 58 of the selecting cam 62.

Thus, in this tilt cylinder apparatus 60, when the operating lever 48 is rotated by an outside force so as to bring the grip portion 54 to a position A, a proximal end of the selecting pin 45 engages the cutout portion 62A of the selecting cam 62, so that it does not press the ball 49 in the relief valve 43 against a spring urging force of the spring 51. Thus, the relief valve 43 shuts down the communicating path 21, so that the tilt cylinder apparatus 60 is held in its tilt lock condition.

When the operating lever 48 is rotated by an outside force so as to bring the grip portion 54 to the position B, the proximal end of the selecting pin 45 rides over a portion other than the cutout portion 62A from the cutout portion 62A of the selecting cam 62 so that it presses the ball 49 in the relief valve 43 against the spring urging force of the spring 51. Thus the communicating path 21 is brought into a communicating condition, so that due to action of air pressure in the air chamber 34 of the reservoir chamber 20, hydraulic fluid in the rod side chamber 30A flows into the piston side chamber 30B through the communicating path 21, the conduit pipe 42 and the fluid chamber 33, and at the same time, the piston rod 28 is pushed out of the cylinder unit 18 thereby the tilt cylinder apparatus 60 tilting up the propeller unit 13.

As described above, the tilt cylinder apparatus 60 according to the second embodiment of the present invention exerts the effects (1)–(4) like the tilt cylinder apparatus 17 according to the first embodiment.

The conduit pipe 42 provided in the reservoir chamber 20 is not restricted to a pipe, but may be a fluid path or the like formed by sectioning by two right and left partition plates between the outside and inside cylinders 23, 24.

According to the tilt cylinder apparatus for the outboard propeller of the boat according to the present invention, the apparatus thereof can be formed in a compact structure thereby raising the operability of the apparatus.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A tilt cylinder apparatus for a boat propeller unit, which is disposed between a boat body and said boat propeller unit supported tiltingly by said boat body for upwardly tilting said boat propeller unit, said tilt cylinder apparatus comprising:

a cylinder unit containing an inside cylinder and an outside cylinder, an opening portion of said cylinders being closed by rod guides, an interior of said inside cylinder being filled with hydraulic fluid;

a piston having a buffering valve mechanism, which is disposed slidably in said interior of said inside cylinder and connected to an end of a piston rod placed through said rod guides such that said interior of said inside cylinder is sectioned to a rod side chamber in which said piston rod exists and a piston side chamber in which said piston rod does not exist;

a reservoir chamber which is formed between said inside cylinder and said outside cylinder and contains a fluid chamber and an air chamber, said fluid chamber communicating with said piston side chamber;

a communicating path which is formed in said rod guides and ensures a communication between said rod side chamber and said fluid chamber of said reservoir chamber through a fluid path formed by sectioning in said reservoir chamber; and a selecting valve which is disposed in said rod guides and selects an opening or closing of said communicating path following an outside operation, wherein when said communicating path is opened by said selecting valve, air pressure in said air chamber of said reservoir chamber pushes said piston rod out of said cylinder unit through said piston side chamber and said piston so as to tilt up said boat propeller unit.

2. The tilt cylinder apparatus for a boat propeller unit according to claim 1 wherein said fluid path formed in said reservoir chamber is a conduit pipe disposed in said reservoir chamber.

3. The tilt cylinder apparatus for a boat propeller unit according to claim 2 wherein said selecting valve comprises:

a relief valve for opening/closing said communicating path in said rod guides;

an operating lever rotatably supported on a side of said rod guides;

a selecting cam fixed at an end portion of said operating lever, located in said rod guides; and a selecting pin which is disposed in said rod guides such that said selecting pin can be pushed by said selecting cam so as to move and drive said relief valve in its opening direction or its closing direction when said selecting pin is pushed so as to move.

4. The tilt cylinder apparatus for a boat propeller unit according to claim 1 wherein said selecting valve comprises:

a relief valve for opening/closing said communicating path in said rod guides;

an operating lever rotatably supported on a side of said rod guides;

a selecting cam fixed at an end portion of said operating lever, located in said rod guides; and a selecting pin which is disposed in said rod guides such that said selecting pin can be pushed by said selecting cam so as to move and drive said relief valve in its opening direction or its closing direction when said selecting pin is pushed so as to move.

* * * * *